(12) United States Patent  
Morishita

(10) Patent No.: US 12,296,605 B2
(45) Date of Patent: May 13, 2025

(54) IMAGE FORMING APPARATUS AND METHOD FOR CONTROLLING IMAGE FORMING APPARATUS

(71) Applicant: SEIKO EPSON CORPORATION, Tokyo (JP)

(72) Inventor: Kazuya Morishita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 18/068,158

(22) Filed: Dec. 19, 2022

(65) Prior Publication Data

US 2023/0191815 A1 Jun. 22, 2023

(30) Foreign Application Priority Data

Dec. 21, 2021 (JP) ................. 2021-206755

(51) Int. Cl.
*B41J 29/393* (2006.01)
*B41J 13/10* (2006.01)

(52) U.S. Cl.
CPC ........... *B41J 29/393* (2013.01); *B41J 13/103* (2013.01)

(58) Field of Classification Search
CPC ....... H04L 12/40; B41J 29/393; B41J 13/103; G06F 3/121; G06F 3/1212
See application file for complete search history.

(56) References Cited

FOREIGN PATENT DOCUMENTS

| JP | H08-008935 A | 1/1996 |
| JP | 2007-314334 A | 12/2007 |

*Primary Examiner* — Jason S Uhlenhake
(74) *Attorney, Agent, or Firm* — WORKMAN NYDEGGER

(57) ABSTRACT

An image forming apparatus including a main body control apparatus, a main body cassette, and an additional cassette different from the main body cassette and coupled to a bus-shaped communication line to which the main body control apparatus is coupled, and the main body control apparatus transmits in image formation an acknowledgement unnecessary command indicating that an acknowledgement is unnecessary to the additional cassette in accordance with the state of the image forming apparatus relating to the additional cassette.

8 Claims, 5 Drawing Sheets

IMAGE FORMING APPARATUS AND METHOD FOR CONTROLLING IMAGE FORMING APPARATUS

The present application is based on, and claims priority from JP Application Serial Number 2021-206755, filed Dec. 21, 2021, the disclosure of which is hereby incorporated by reference herein in its entirety.

BACKGROUND

1. Technical Field

The present disclosure relates to an image forming apparatus and a method for controlling the image forming apparatus.

2. Related Art

There is a known image forming apparatus including cassettes that can contain media, such as paper sheets. For example, JP-A-8-008935 discloses an image forming apparatus including a plurality of additional cassettes coupled to an apparatus main body via a bus. The image forming apparatus described in JP-A-8-008935 identifies one of the additional cassettes, and the apparatus main body instructs the identified additional cassette to carry out a predetermined process.

In an image forming apparatus such as the apparatus described in JP-A-8-008935, acknowledgment transmission and reception is typically performed between a cassette and an apparatus that instructs the cassette to carry out a process. In the image forming apparatus that transmits and receives an acknowledgement, however, image formation may involve time-consuming transmission and reception of the acknowledgement, and communication with a plurality of cassettes coupled via a bus involves sequential communication with each of the cassettes to avoid data collision. The transmission and reception of acknowledgments can therefore be an obstacle to speeding up the image formation in the image forming apparatus.

SUMMARY

An aspect that solves the problem described above relates to an image forming apparatus including a control apparatus, a first cassette, and a second cassette different from the first cassette and coupled to a bus-shaped communication line to which the control apparatus is coupled, and the control apparatus transmits in image formation an acknowledgement unnecessary command indicating that an acknowledgement is unnecessary to the second cassette in accordance with a state of the image forming apparatus relating to the second cassette.

Another aspect that solves the problem described above relates to a method for controlling an image forming apparatus including a control apparatus, a first cassette, and a second cassette different from the first cassette and coupled to bus-shaped communication to which the control apparatus is coupled, and the control apparatus transmits in image formation an acknowledgement unnecessary command indicating that an acknowledgement is unnecessary to the second cassette in accordance with a state of the image forming apparatus relating to the second cassette.

DESCRIPTION OF EXEMPLARY EMBODIMENTS

An embodiment will be described below with reference to the drawings.

Figure 1:
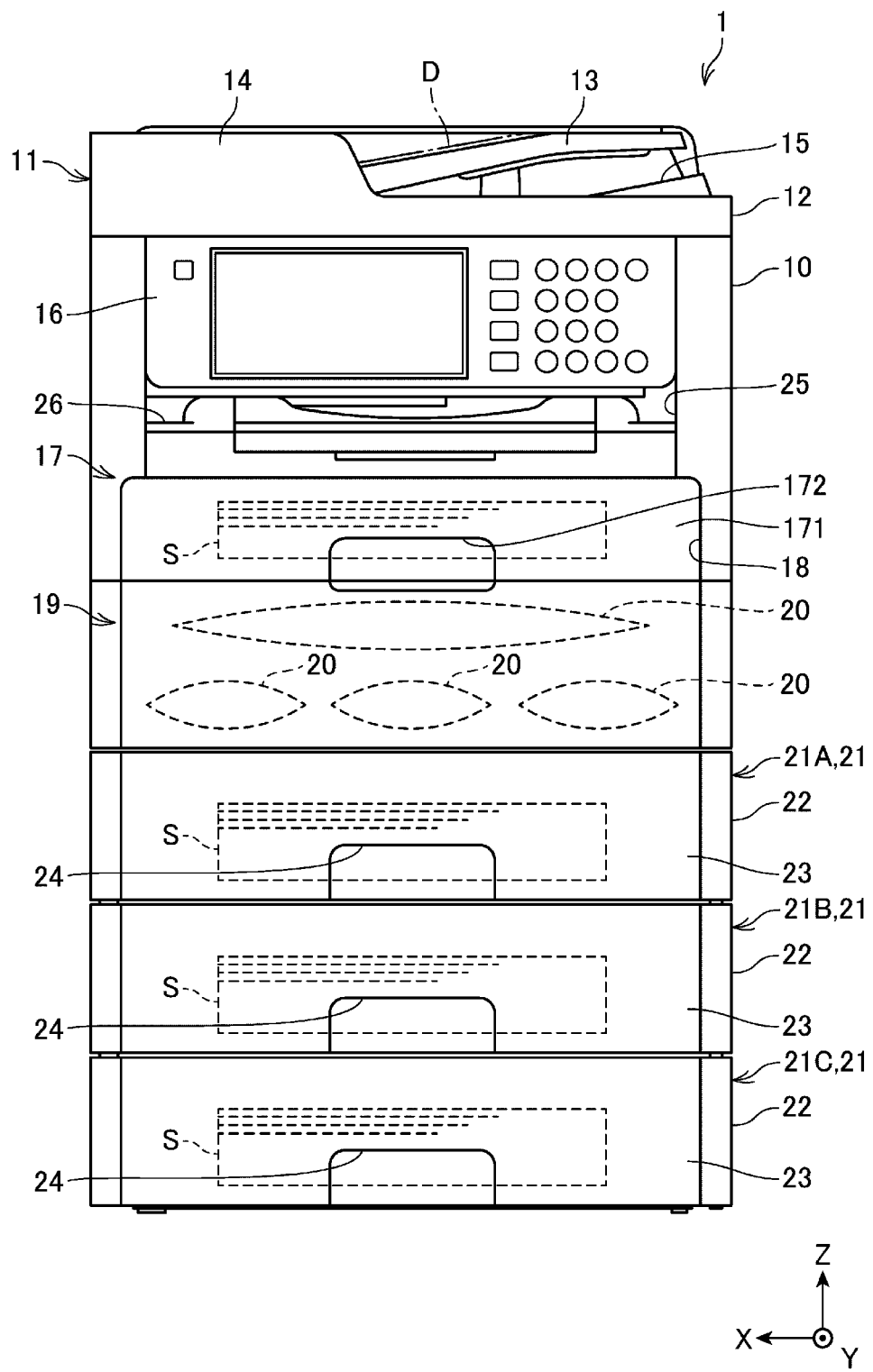
FIG. 1 is a front view showing an image forming apparatus.
Figure 2:
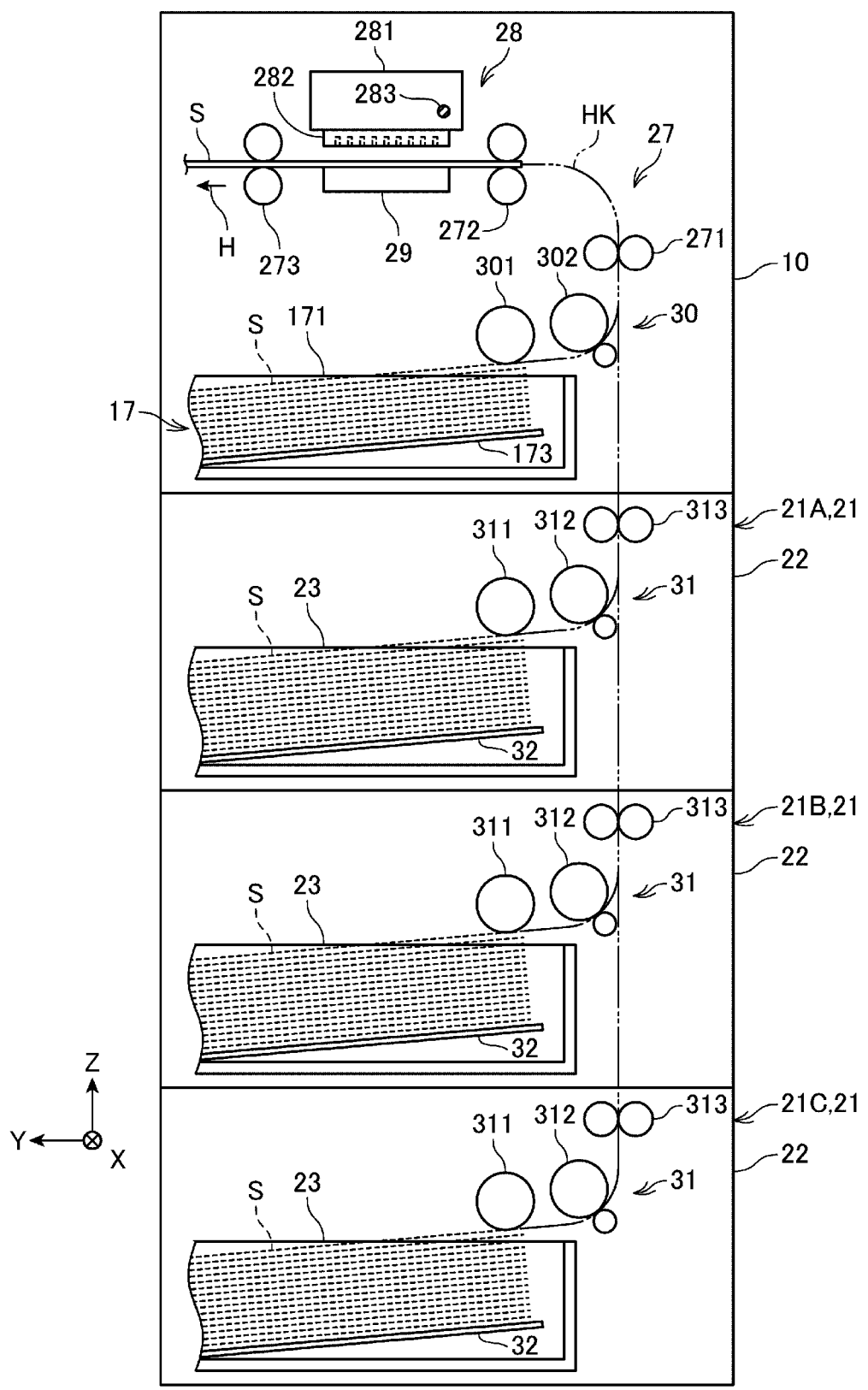
FIG. 2 diagrammatically shows a side cross section of the image forming apparatus.

FIGS. 1 and 2 show axes X, Y, and Z. The axes X, Y, and Z are perpendicular to each other. The axis Z represents the upward-downward direction and the vertical direction in the state in which an image forming apparatus 1 is installed. The axes X and Y are parallel to the horizontal direction. The axis Y represents the frontward-rearward direction of the image forming apparatus 1. The axis X represents the rightward-leftward direction of the image forming apparatus 1. The positive direction of the axis Z represents the upward direction. The positive direction of the axis Y represents the frontward direction. The positive direction of the axis X represents the leftward direction. The forward-facing surface of the image forming apparatus 1 is the front surface of the image forming apparatus 1.

FIG. 1 is a front view showing the image forming apparatus 1.

The image forming apparatus 1 according to the present embodiment is called a multifunction peripheral (MFP), and is a multifunctional machine having a variety of functions, such as image formation, facsimile, and scanning.

The image forming apparatus 1 includes a reading unit 11 at the top of an apparatus main body 10. The reading unit 11 includes a cover 12, which is provided at the upper surface of the apparatus main body 10 and can be opened and closed, a document tray 13, which is mounted on the cover 12, and an automatic document feeder 14. The reading unit 11 reads a document D, which the automatic document feeder 14 conveys one at a time from the document tray 13, or a document D placed on a glass table exposed when the cover 12 is opened. The document D read by the reading unit 11 is discharged onto a discharge tray 15.

An operation panel 16 is provided at an upper front portion of the apparatus main body 10. The operation panel 16 includes a plurality of operation switches, a display, a touch panel, and other devices.

The image forming apparatus 1 includes a main body cassette 17. The main body cassette 17 is provided in a recess 18 formed in the apparatus main body 10 at a position below the operation panel 16. The main body cassette 17 includes a main body tray 171, which can contain media S, such as paper sheets, which are stacked on each other. The main body tray 171 can contain one or more media S. A grip 172, which a user uses to pull out the main body tray 171, is formed at the front surface of the main body tray 171.

The main body cassette 17 is an example of a "first cassette".

The image forming apparatus 1 includes an ink container 19 below the main body cassette 17. The ink container 19 contains ink packs 20, which are ink supply sources. The ink container 19 contains a plurality of ink packs 20, which contain inks having colors different from one another.

The image forming apparatus 1 includes a first additional cassette 21A, a second additional cassette 21B, and a third additional cassette 21C below the apparatus main body 10. In the following description, when the first additional cassette 21A, the second additional cassette 21B, and the third additional cassette 21C are not distinguished from one another, the additional cassettes are collectively referred to as "additional cassettes" followed by a reference number "21".

The additional cassettes 21 are an example of a "second cassette".

The first additional cassette 21A, the second additional cassette 21B, and the third additional cassettes 21C have substantially the same configuration. Therefore, in the description of the configuration of the additional cassettes 21 with reference to FIG. 1, the configuration of the first additional cassette 21A will be described as a representative additional cassette, and the configurations of the second additional cassette 21B and the third additional cassette 21C will not be described.

The first additional cassette 21A includes an enclosure 22 and an additional tray 23 incorporated in the enclosure 22. The additional tray 23 can contain one or more media S. The number of media S containable in the additional tray 23 may be greater or smaller than or equal to the number containable in the main body cassette 17. A grip 24, which the user uses to pull out the additional tray 23, is formed at the front surface of the additional tray 23.

When receiving image formation data from an external apparatus such as a PC (personal computer), the image forming apparatus 1 identifies a cassette corresponding to information on the media S indicated by the received image formation data and conveys a medium S from the identified cassette. The image formation data contains the information on the media S on each of which an image is formed, image data on an image to be formed on each of the media S, and a variety of control commands that comply with a command system of the image forming apparatus 1. The image forming apparatus 1 performs image formation by discharging the inks supplied from the interior of the ink container 19 onto a medium S conveyed along a conveyance path HK, which is formed in the apparatus main body 10 and will be described later.

The medium S on which an image has been formed is discharged via a discharge port 25, which is an opening provided between the operation panel 16 and the main body cassette 17 in the apparatus main body 10. A slidable discharge tray 26, which is formed of a plurality of plates configured to be extendable and retractable in the frontward-rearward direction, is provided at the bottom of the discharge port 25. The medium S discharged via the discharge port 25 is placed on the extended discharge tray 26.

FIG. 2 diagrammatically shows a side cross section of the image forming apparatus 1. The ink container 19 is omitted in FIG. 2.

The first additional cassette 21A, the second additional cassette 21B, and the third additional cassettes 21C have substantially the same configuration. Therefore, in the description of the configuration of the additional cassettes 21 with reference to FIG. 2, the configuration of the first additional cassette 21A will be described as a representative additional cassette, and the configurations of the second additional cassette 21B and the third additional cassette 21C will not be described as appropriate.

The apparatus main body 10 includes a first main body conveyer 27. The first main body conveyer 27 conveys in a conveyance direction H a medium S conveyed from the main body cassette 17 or any of the additional cassettes 21. The first main body conveyer 27 includes a first main body conveying roller pair 271, a second main body conveying roller pair 272, and a third main body conveying roller pair 273. The first main body conveying roller pair 271, the second main body conveying roller pair 272, and the third main body conveying roller pair 273 each include a rotary roller rotated by motor power and a driven roller driven by the rotation of the rotary roller. The second main body conveying roller pair 272 is provided downstream from the first main body conveying roller pair 271 in the conveyance direction H of the medium S. The third main body conveying roller pair 273 is provided downstream from the second main body conveying roller pair 272 in the conveyance direction H of the medium S.

The image forming apparatus 1 includes an image forming unit 28. The image forming unit 28 is provided between the second main body conveying roller pair 272 and the third main body conveying roller pair 273 in the conveyance direction H, as shown in FIG. 2. The image forming unit 28 includes a carriage 281 and an inkjet head 282 mounted on the carriage 281.

The carriage 281 is supported by a carriage shaft 283 extending in a direction perpendicular to the conveyance direction H, and moves the inkjet head 282 along the carriage shaft 283 in the direction perpendicular to the conveyance direction H.

The inkjet head 282 includes, for example, nozzle rows corresponding to four colors, CMYK. The inkjet head 282 receives the inks supplied from the ink container 19 and discharges the inks from nozzles provided in the nozzle rows to form an image on the medium S.

In the conveyance path HK of the medium S, a platen 29 is provided at a position where the platen 29 faces the inkjet head 282. The platen 29 extends over the range where the inkjet head 282 can form an image, and flattens and supports the medium S in such a way that the surface of the medium S placed at the platen 29 is perpendicular to the discharge direction in which the inks are discharged from the inkjet head 282.

The apparatus main body 10 includes a second main body conveyer 30. The second main body conveyer 30 conveys the media S contained in the main body cassette 17 one by one to the first main body conveyer 27. The second main body conveyer 30 includes a main body pickup roller 301 and a main body separation roller pair 302. The main body pickup roller 301 is a roller that feeds from the main body tray 171 the medium S located at the top of the media S placed in the main body tray 171. Even when a plurality of the media S stacked on each other are fed by the main body pickup roller 301, the main body separation roller pair 302 conveys the media S one by one toward the first main body conveyer 27. The main body separation roller pair 302 includes a rotary roller and a driven roller driven by the rotation of the rotary roller. The main body cassette 17 includes a hopper plate 173, on which the media S are placed in the main body tray 171. In the main body cassette 17, the hopper plate 173 tilts, so that the media S contained in the main body tray 171 are pressed against the main body pickup roller 301. The main body cassette 17 in the present embodiment causes the hopper plate 173 to tilt by mechanically driving the hopper plate 173 with a force produced when the main body cassette 17 is inserted into the recess 18.

The first additional cassette 21A includes an additional conveyer 31. The additional conveyer 31 conveys the media S contained in the additional tray 23 one by one to the apparatus main body 10. The additional conveyor 31 includes an additional pickup roller 311, an additional separation roller pair 312, and an additional conveying roller pair 313.

The additional pickup roller 311, the additional separation roller pair 312, and the additional conveying roller pair 313 are each an example of a "mechanical mechanism".

The additional pickup roller 311 is a roller that feeds from the additional tray 23 the medium S located at the top of the media S placed in the additional tray 23.

Even when a plurality of the media S stacked on each other are fed by the additional pickup roller 311, the additional separation roller pair 312 conveys the media S one by one toward the additional conveying roller pair 313. The additional separation roller pair 312 includes a rotary roller and a driven roller driven by the rotation of the rotary roller.

The additional conveying roller pair 313 includes a rotary roller and a driven roller. The additional conveying roller pair 313 conveys the medium S conveyed from the additional separation roller pair 312 to the apparatus main body 10 installed at a position upwardly adjacent to the first additional cassette 21A. The additional conveying roller pair 313 further conveys a medium S conveyed from the additional cassette 21B installed below the first additional cassette 21A to the apparatus main body 10 installed at the position upwardly adjacent to the first additional cassette 21A.

The additional conveying roller pair 313 of the second additional cassette 21B conveys a medium S contained in the second additional cassette 21B or a medium S conveyed from the third additional cassette 21C to the first additional cassette 21A. The additional conveying roller pair 313 of the third additional cassette 21C conveys a medium S contained in the third additional cassette 21C to the second additional cassette 21B.

The first additional cassette 21A, in which the hopper plate 32 tilts, causes the media S to be pressed against the additional pickup roller 311. The first additional cassette 21A causes the hopper plate 32 to tilt by electrically driving the hopper plate 32, so that the media S are pressed against the additional pickup roller 311.

The hopper plate 32 is an example of the "mechanical mechanism".

The configuration of a control system of the image forming apparatus 1 will next be described.

Figure 3:
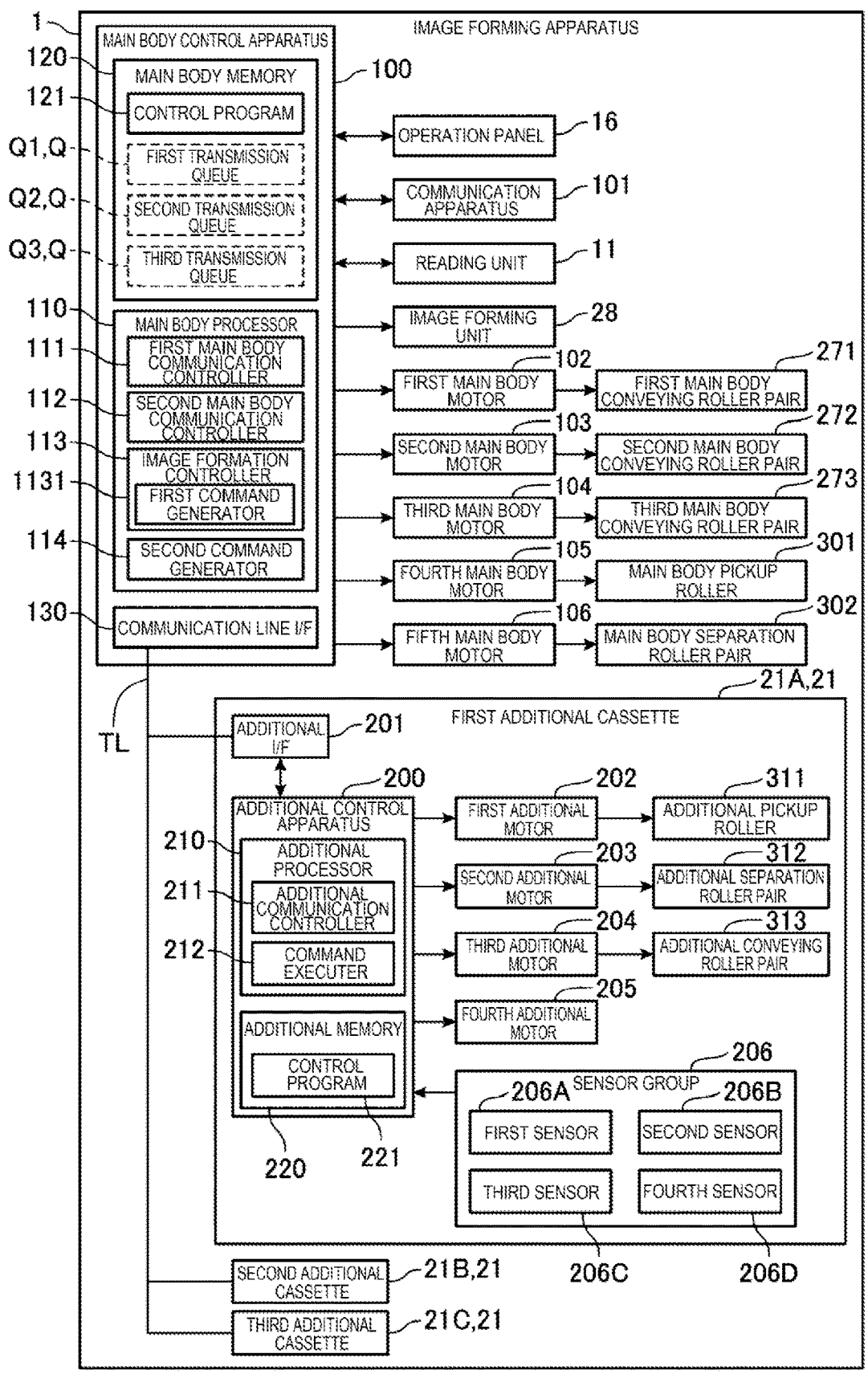
FIG. 3 is a block diagram showing the configuration of a control system of the image forming apparatus.

FIG. 3 is a block diagram showing the configuration of the control system of the image forming apparatus 1.

The image forming apparatus 1 includes a main body control apparatus 100, as shown in FIG. 3.

The main body control apparatus 100 includes a main body processor 110, such as a CPU (central processing unit), which executes a program, a main body memory 120, and a communication line I/F 130. I/F is an abbreviation for interface. The main body control apparatus 100, in which the main body processor 110 reads and executes a control program 121 stored in the main body memory 120, controls each portion of the image forming apparatus 1. The main body processor 110 executes the control program 121 stored in the main body memory 120 to function as a first main body communication controller 111, a second main body communication controller 112, an image formation controller 113, and a second command generator 114.

The main body control apparatus 100 is an example of a "control apparatus". The main body memory 120 is an example of a "storage".

The main body memory 120 is a memory that stores the control program 121, other programs executed by the main body processor 110, data processed by the main body processor 110, and other pieces of information. The main body memory 120 has a nonvolatile storage area. The main body memory 120 may have a volatile storage area to form a work area for the main body processor 110.

The communication line I/F 130 includes a connector, a communication circuit, and other types of communication hardware. A bus-shaped communication line TL, to which the additional cassettes 21 can be coupled, is coupled to the communication line I/F 130. In other words, the additional cassettes 21 are coupled via a bus-shaped line to the communication line I/F 130. The main body control apparatus 100 communicates with the additional cassettes 21 via the communication line TL.

The image forming apparatus 1 includes the operation panel 16, a communication apparatus 101, the reading unit 11, the image forming unit 28, a first main body motor 102, a second main body motor 103, a third main body motor 104, a fourth main body motor 105, and a fifth main body motor 106. The operation panel 16, the communication apparatus 101, the reading unit 11, the image forming unit 28, the first main body motor 102, the second main body motor 103, the third main body motor 104, the fourth main body motor 105, and the fifth main body motor 106 are coupled to the main body control apparatus 100.

The operation panel 16 displays a variety of pieces of information on the display under the control of the main body control apparatus 100. The operation panel 16 outputs a signal corresponding to operation performed on any of the operation switches to the main body control apparatus 100.

The communication apparatus 101 includes communication hardware, such as a communication circuit compliant with a predetermined communication standard, and communicates with an external instrument separate from the image forming apparatus 1 in accordance with the predetermined communication standard.

The reading unit 11 reads the document D under the control of the main body control apparatus 100.

The image forming unit 28 drives the inkjet head 282 and the carriage 281 under the control of the main body control apparatus 100 to form an image on the medium S.

The first main body motor 102 is coupled to the first main body conveying roller pair 271 via a power transmission mechanism. The main body control apparatus 100 drives the first main body motor 102 to rotate the rotary roller of the first main body conveying roller pair 271.

The second main body motor 103 is coupled to the second main body conveying roller pair 272 via a power transmission mechanism. The main body control apparatus 100 drives the second main body motor 103 to rotate the rotary roller of the second main body conveying roller pair 272.

The third main body motor 104 is coupled to the third main body conveying roller pair 273 via a power transmission mechanism. The main body control apparatus 100 drives the third main body motor 104 to rotate the rotary roller of the third main body conveying roller pair 273.

The fourth main body motor 105 is coupled to the main body pickup roller 301 via a power transmission mechanism. The main body control apparatus 100 drives the fourth main body motor 105 to rotate the main body pickup roller 301.

The fifth main body motor 106 is coupled to the main body separation roller pair 302 via a power transmission mechanism. The main body control apparatus 100 drives the fifth main body motor 106 to rotate the rotary roller of the main body separation roller pair 302.

As described above, the main body processor 110 functions as the first main body communication controller 111, the second main body communication controller 112, the image formation controller 113, and the second command generator 114. The image formation controller 113 functions as a first command generator 1131.

The first main body communication controller 111 communicates with the external instrument via the communication apparatus 101. For example, the first main body communication controller 111 receives the image formation data from the external instrument.

The second main body communication controller 112 communicates with the additional cassettes 21 coupled to the communication line TL via the communication line I/F 130 and the communication line TL. The second main body communication controller 112 transmits commands generated by the first command generator 1131 and the second command generator 114 to the additional cassettes 21. The action of the second main body communication controller 112 will be described later in detail. When any of the additional cassettes 21 transmits an ACK (acknowledgement), which is an acknowledgement, the second main body communication controller 112 receives the ACK from the additional cassette 21.

The image formation controller 113 performs image formation based on the image formation data received by the first main body communication controller 111. The image formation is a process including the conveyance of a medium S and formation of an image on the medium S.

The image formation controller 113 controls the image forming unit 28, the first main body motor 102, the second main body motor 103, and the third main body motor 104 to perform the image formation.

When the image formation controller 113 performs the image formation on the media S contained in the main body cassette 17, the image formation controller 113 further controls the fourth main body motor 105 and the fifth main body motor 106 to convey a medium S contained in the main body cassette 17 and form an image on the medium S.

When performing the image formation on a medium S contained in any of the additional cassettes 21, the image formation controller 113 outputs a variety of commands to the additional cassette 21 to cause the additional cassette 21 to convey the medium S.

The first command generator 1131 generates commands to be outputted to the additional cassettes 21. The first command generator 1131 causes the main body memory 120 to store the generated commands. In the storage area of the main body memory 120, a transmission queue Q is formed for each of the additional cassettes 21 added to the apparatus main body 10. The transmission queue Q is a storage area that temporarily stores a command to be outputted to the additional cassette 21. The following three transmission queues are formed in the main body memory 120 in the present embodiment: a first transmission queue Q1 corresponding to the first additional cassette 21A; a second transmission queue Q2 corresponding to the second additional cassette 21B; and a third transmission queue Q3 corresponding to the third additional cassette 21C. When generating a command to be outputted to the first additional cassette 21A, the first command generator 1131 causes the first transmission queue Q1 to store the generated command. When generating a command to be outputted to the second additional cassette 21B, the first command generator 1131 causes the second transmission queue Q2 to store the generated command. When generating a command to be outputted to the third additional cassette 21C, the first command generator 1131 causes the third transmission queue Q3 to store the generated command.

In the present embodiment, a command generated by the first command generator 1131 is a hardware-based command.

A hardware-based command is a command relating to hardware provided in the additional cassettes 21. In the present embodiment, the hardware-based command includes a first mechanism drive command, a second mechanism drive command, a third mechanism drive command, a fourth mechanism drive command, a first sensor command, a second sensor command, a third sensor command, and a fourth sensor command.

The first mechanism drive command, the second mechanism drive command, the third mechanism drive command, and the fourth mechanism drive command are each an example of a "drive command".

The first mechanism drive command is a command that instructs driving the additional pickup roller 311. The first mechanism drive command specifies, for example, the amount of rotation of the additional pickup roller 311.

The second mechanism drive command is a command that instructs driving the additional separation roller pair 312. The second mechanism drive command specifies, for example, the amount of rotation of the rotary roller of the additional separation roller pair 312.

The third mechanism drive command is a command that instructs driving the additional conveying roller pair 313. The third mechanism drive command specifies, for example, the amount of rotation of the rotary roller of the additional conveying roller pair 313.

The fourth mechanism drive command is a command that instructs driving the hopper plate 32.

The first sensor command is a command that requests a value detected by a first sensor 206A.

The first sensor 206A is a sensor that detects whether or not the additional tray 23 contains the media S.

The second sensor command is a command that requests a value detected by a second sensor 206B.

The second sensor 206B is a sensor that detects the position of the media S in the additional tray 23.

The third sensor command is a command that requests a value detected by a third sensor 206C.

The third sensor 206C is a sensor that detects the size of the media S contained in the additional tray 23.

The fourth sensor command is a command that requests a value detected by a fourth sensor 206D.

The fourth sensor 206D is a sensor that detects whether or not the additional tray 23 is present.

When generating a command, the first command generator 1131 associates a flag representing whether or not an ACK is necessary with the generated command. The first command generator 1131 sets the command to be generated as an acknowledgement necessary command or an acknowledgement unnecessary command by changing the content of the flag associated with the command. The acknowledgement necessary command is a command associated with a flag representing that an ACK is necessary. The first command generator 1131 can set all hardware-based commands to be acknowledgement necessary commands. The acknowledgement unnecessary command is a command associated with a flag representing that an ACK is unnecessary. The first command generator 1131 can set the first mechanism drive command, the second mechanism drive command, the third mechanism drive command, the fourth mechanism drive command, the first sensor command, and the second sensor command to each be an acknowledgement unnecessary command.

The first command generator 1131 determines the type of a command based, for example, on an instruction code, and appropriately changes the content of the flag representing whether or not an ACK is necessary.

The first command generator 1131 generates the first mechanism drive command, the second mechanism drive command, the third mechanism drive command, the fourth mechanism drive command, the first sensor command, and the second sensor command as acknowledgement unnecessary commands in accordance with the state of the image forming apparatus 1 relating to the additional cassettes 21. In the present embodiment, the first command generator 1131 generates the acknowledgement unnecessary commands in accordance with whether or not the state of the image forming apparatus 1 is a state in which at least one additional cassette 21 is coupled to the communication line TL. The first command generator 1131 generates each of the first mechanism drive command, the second mechanism drive command, the third mechanism drive command, the fourth mechanism drive command, the first sensor command, and the second sensor command as an acknowledgement unnecessary command when the number of additional cassettes 21 coupled to the communication line TL is one or more. On the other hand, when the number of additional cassettes 21 coupled to the communication line TL is smaller than one, the first command generator 1131 generates no commands to be outputted to the additional cassettes 21. For example, when data having recorded the number of coupled additional cassettes 21 is stored in the main body memory 120, the first command generator 1131 evaluates whether or not the number of additional cassettes 21 coupled to the communication line TL is one or more based on the data.

The number of one is an example of a "predetermined number".

The second command generator 114 generates commands to be output to the additional cassettes 21. When generating a command to be outputted to the first additional cassette 21A, the second command generator 114 causes the first transmission queue Q1 to store the generated command. When generating a command to be outputted to the second additional cassette 21B, the second command generator 114 causes the second transmission queue Q2 to store the generated command. When generating a command to be outputted to the third additional cassette 21C, the second command generator 114 causes the third transmission queue Q3 to store the generated command.

In the present embodiment, a command generated by the second command generator 114 is a software-based command. A software-based command is a command relating to software for the additional cassettes 21. In the present embodiment, the software-based command includes a first firmware command, a second firmware command, and a time setting command.

The first firmware command is a command that requests the version of the firmware for the additional cassettes 21.

The second firmware command is a command that instructs updating the firmware for the additional cassettes 21.

The time setting command is a command that instructs the additional cassettes 21 to set the time.

When generating a command, the second command generator 114 associates a flag representing whether or not an ACK is necessary with the generated command. The second command generator 114 generates each command to be generated as an acknowledgement necessary command.

The configuration of a control system of each of the additional cassettes 21 will next be described with reference to FIG. 3.

The first additional cassette 21A, the second additional cassette 21B, and the third additional cassettes 21C have substantially the same configuration. Therefore, in the description of the configuration of the additional cassettes 21 with reference to FIG. 3, the configuration of the first additional cassette 21A will be described as a representative additional cassette, and the configurations of the second additional cassette 21B and the third additional cassette 21C will not be described.

The first additional cassette 21A includes an additional control apparatus 200. The additional control apparatus 200 includes an additional processor 210, such as a CPU, which executes a program, and an additional memory 220. In the additional control apparatus 200, the additional processor 210 reads and executes a control program 221 stored in the additional memory 220 to control each portion of the first additional cassette 21A. The additional processor 210 executes the control program 221 stored in the additional memory 220 to function as an additional communication controller 211 and a command executer 212.

The additional memory 220 is a memory that stores the control program 221, other programs executed by the additional processor 210, data processed by the additional processor 210, and other pieces of information. The additional memory 220 has a nonvolatile storage area. The additional memory 220 may have a volatile storage area to form a work area for the additional processor 210.

The first additional cassette 21A includes an additional I/F 201. The additional I/F 201 includes a connector and other types of communication hardware. The additional I/F 201 is coupled to the bus-shaped communication line TL and communicates with the main body control apparatus 100 via the communication line TL.

The first additional cassette 21A includes a first additional motor 202, a second additional motor 203, a third additional motor 204, and a fourth additional motor 205. The motors are coupled to the additional control apparatus 200.

The first additional motor 202 is coupled to the additional pickup roller 311 via a power transmission mechanism. The additional control apparatus 200 drives the first additional motor 202 to rotate the additional pickup roller 311.

The second additional motor 203 is coupled to the additional separation roller pair 312 via a power transmission mechanism. The additional control apparatus 200 drives the second additional motor 203 to rotate the rotary roller of the additional separation roller pair 312.

The third additional motor 204 is coupled to the additional conveying roller pair 313 via a power transmission mechanism. The additional control apparatus 200 drives the third additional motor 204 to rotate the rotary roller of the additional conveying roller pair 313.

The fourth additional motor 205 tilts the hopper plate 32 via a power transmission mechanism. The additional control apparatus 200 drives the fourth additional motor 205 to tilt the hopper plate 32.

The first additional cassette 21A includes a sensor group 206. The sensor group 206 includes a first sensor 206A, a second sensor 206B, a third sensor 206C, and a fourth sensor 206D, and outputs values detected by the sensors to the additional control apparatus 200.

The additional processor 210 functions as the additional communication controller 211 and the command executer 212, as described above.

The additional communication controller 211 communicates with the main body control apparatus 100 via the additional I/F 201. The additional communication controller 211 receives a command from the main body control apparatus 100. When the command received from the main body control apparatus 100 is not an acknowledgement unnecessary command, the additional communication controller 211 transmits an ACK to the main body control apparatus 100 in response to the received command. When the command received from the main body control apparatus 100 is an acknowledgement unnecessary command, the additional communication controller 211 does not transmit an ACK to the main body control apparatus 100 in response to the received command.

The command executer 212 executes the command received by the additional communication controller 211. When the command received by the additional communication controller 211 is corrupted, the command executer 212 discards the command. The command corruption detection is performed by using an existing approach, such as a hash function and a checksum.

When the command received by the additional communication controller 211 is the first mechanism drive command, the command executer 212 drives the first additional motor 202 to rotate the additional pickup roller 311 by the amount of rotation specified in the first mechanism drive command.

When the command received by the additional communication controller 211 is the second mechanism drive command, the command executer 212 drives the second additional motor 203 to rotate the rotary roller of the additional separation roller pair 312 by the amount of rotation specified in the second mechanism drive command.

When the command received by the additional communication controller 211 is the third mechanism drive command, the command executer 212 drives the third additional motor 204 to rotate the rotary roller of the additional conveying roller pair 313 by the amount of rotation specified in the third mechanism drive command.

When the command received by the additional communication controller 211 is the fourth mechanism drive command, the command executer 212 drives the fourth additional motor 205 to tilt the hopper plate 32.

When the command received by additional communication controller 211 is the first sensor command, the command executer 212 outputs the value detected by the first sensor 206A to the additional communication controller 211. The additional communication controller 211 outputs the outputted value detected by the first sensor 206A to the main body control apparatus 100.

When the command received by additional communication controller 211 is the second sensor command, the command executer 212 outputs the value detected by the second sensor 206B to the additional communication controller 211. The additional communication controller 211 outputs the outputted value detected by the second sensor 206B to the main body control apparatus 100.

When the command received by additional communication controller 211 is the third sensor command, the command executer 212 outputs the value detected by the third sensor 206C to the additional communication controller 211. The additional communication controller 211 outputs the outputted value detected by the third sensor 206C to the main body control apparatus 100.

When the command received by additional communication controller 211 is the fourth sensor command, the command executer 212 outputs the value detected by the fourth sensor 206D to the additional communication controller 211. The additional communication controller 211 outputs the outputted value detected by the fourth sensor 206D to the main body control apparatus 100.

When the command received by the additional communication controller 211 is the first firmware command, the command executer 212 causes the additional communication controller 211 to transmit information representing the version of the firmware for the additional cassettes 21 to the main body control apparatus 100.

When the command received by the additional communication controller 211 is the second firmware command, the command executer 212 updates the firmware for the additional cassettes 21.

When the command received by the additional communication controller 211 is the time setting command, the command executer 212 sets the time measured by the additional cassettes 21.

The action of the image forming apparatus 1 will next be described.

The action of the image forming apparatus 1 involved in exclusive control performed on the additional cassettes 21 will first be described. When causing one additional cassette 21 to convey a medium S, the image forming apparatus 1 performs exclusive control on the one additional cassette 21. The exclusive control avoids data collision in the communication line TL in the case where a plurality of additional cassettes 21 are coupled to the communication line TL.

The second main body communication controller 112 transmits a communication right grant command to the additional cassette 21 under the exclusive control. The communication right grant command is a command for granting a communication right for exclusive communication control, that is, the exclusive control. The transmission of the communication right grant command causes the main body control apparatus 100 to start the exclusive control of the additional cassette 21 to which the communication right grant command has been transmitted. Note that a flag representing that an ACK is necessary is associated with the communication right grant command.

The additional communication controller 211 of the additional cassette 21 on which the exclusive control is performed transmits a communication right return command to the main body control apparatus 100 when a predetermined trigger occurs. The communication right return command is a command for returning the communication right for the exclusive control. For example, when a command to be processed last by the command executer 212 in the conveyance of a medium S is specified in advance, the additional communication controller 211 transmits the communication right return command to the main body control apparatus 100 when the command executer 212 has processed the command as the trigger. The transmission of the communication right return command causes the image forming apparatus 1 to terminate the exclusive control of the additional cassette 21 that has transmitted the communication right return command. Note that a flag representing that an ACK is necessary is associated with the communication right return command.

The action of the second main body communication controller 112 involved in the transmission of the commands stored in the transmission queues Q will next be described.

Figure 4:
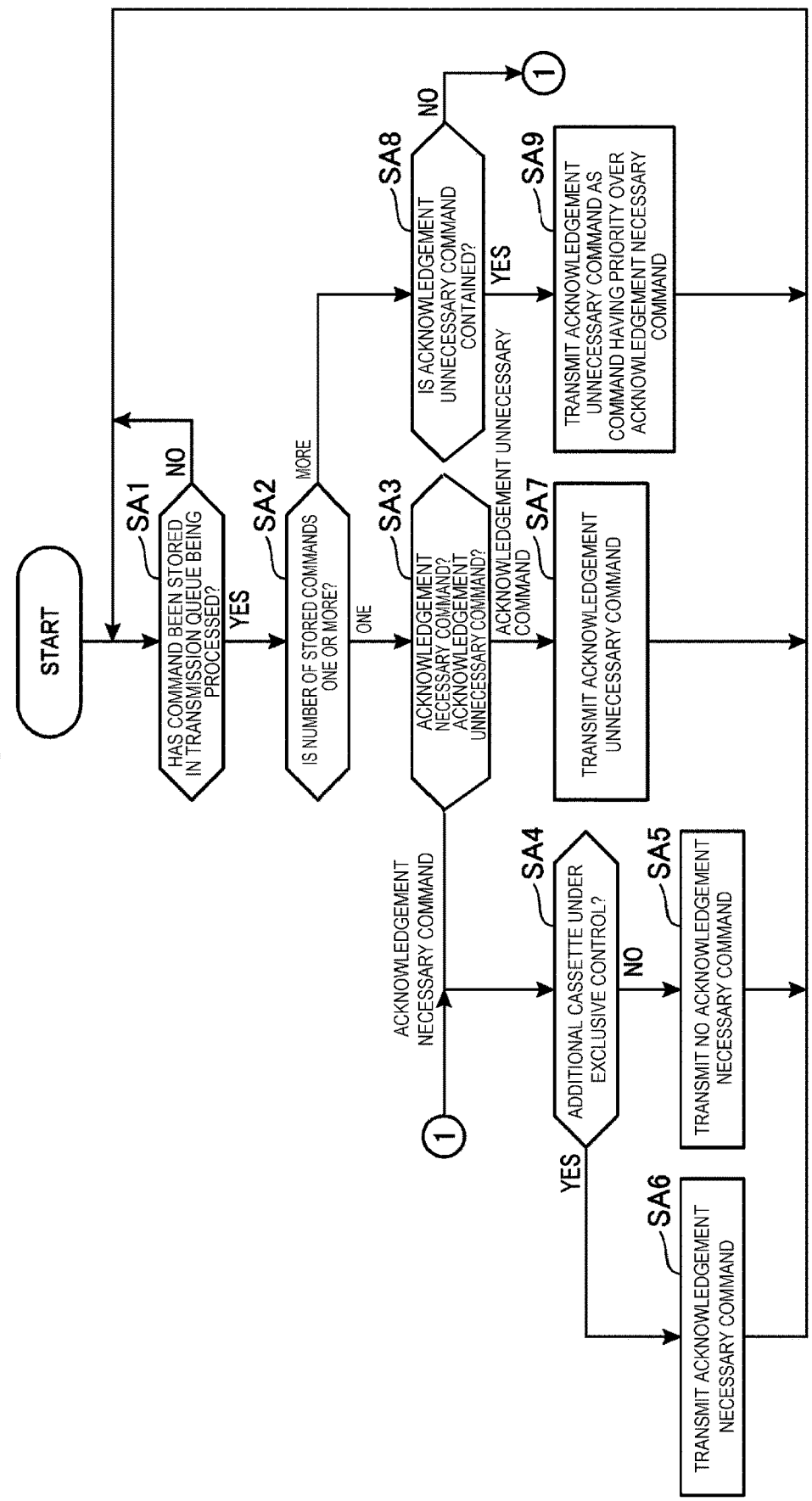
FIG. 4 is a flowchart showing the action of a second main body communication controller.

FIG. 4 is a flowchart showing the action of the second main body communication controller 112.

The action shown in FIG. 4 is the action of the second main body communication controller 112 that processes one transmission queue Q. To process a plurality of transmission queues Q, the second main body communication controller 112 performs the action shown in FIG. 4 for each of the transmission queues Q.

The second main body communication controller 112 evaluates whether or not a command has been stored in the transmission queue Q being processed (step SA1).

When the result of the evaluation shows that no command has been stored in the transmission queue Q being processed (NO in step SA1), the second main body communication controller 112 performs the evaluation in step SA1 again.

On the other hand, when the result of the evaluation shows that a command has been stored in the transmission queue Q being processed (YES in step SA1), the second main body communication controller 112 evaluates whether the number of commands having been stored in the transmission queue Q being processed is one or plural (step SA2).

When the result of the evaluation shows that the number of commands stored in the transmission queue Q being processed is one (one in step SA2), the second main body communication controller 112 evaluates whether a command stored in the transmission queue Q being processed is an acknowledgement necessary command or an acknowledgement unnecessary command (step SA3). The evaluation in step SA3 is performed based, for example, on the flag representing whether or not an ACK is necessary.

When the result of the evaluation shows that a command stored in the transmission queue Q being processed is an acknowledgement necessary command (acknowledgement necessary command in step SA3), the second main body communication controller 112 evaluates whether or not the additional cassette 21 corresponding to the transmission queue Q being processed is the additional cassette 21 under the exclusive control (step SA4).

When the result of the evaluation shows that the additional cassette 21 in question is not the additional cassette 21 under the exclusive control (NO in step SA4), the second main body communication controller 112 transmits no acknowledgement necessary command to the additional cassette 21 (step SA5).

On the other hand, when the result of the evaluation shows that the additional cassette 21 in question is the additional cassette 21 under the exclusive control (YES in step SA4), the second main body communication controller 112 transmits an acknowledgement necessary command to the additional cassette 21 corresponding to the transmission queue Q being processed (step SA6).

Returning to the description of step SA3, when the result of the evaluation shows that a command stored in the transmission queue Q being processed is an acknowledgement unnecessary command (acknowledgement unnecessary command in step SA3), the second main body communication controller 112 transmits an acknowledgement unnecessary command to the additional cassette 21 corresponding to the transmission queue Q being processed (step SA7).

Returning to the description of step SA2, when the result of the evaluation shows that the number of commands stored in the transmission queue Q being processed is plural (plural in step SA2), the second main body communication controller 112 evaluates whether or not the commands stored in the transmission queue Q being processed contain an acknowledgement unnecessary command (step SA8). The evaluation in step SA8 is performed based, for example, on the flag representing whether or not an ACK is necessary.

When the result of the evaluation shows that an acknowledgement unnecessary command is contained (YES in step SA8), the second main body communication controller 112 transmits an acknowledgement unnecessary command to the additional cassette 21 corresponding to the transmission queue Q being processed in such a way that the acknowledgement unnecessary command has priority over an acknowledgement necessary command out of the commands stored in the transmission queue Q being processed (step SA9).

When the transmission queue Q being processed contains a plurality of acknowledgement unnecessary commands, and when the transmission order of the plurality of acknowledgement unnecessary commands is specified, the second main body communication controller 112 transmits in step SA9 the plurality of acknowledgement unnecessary commands to the additional cassette 21 in accordance with the transmission order specified in advance. The transmission order is stored as data in the main body memory 120.

For example, it is assumed that the transmission order of the fourth mechanism drive command and the third mechanism drive command is so specified in advance that the third mechanism drive command is transmitted after the fourth mechanism drive command. It is further assumed that the transmission queue Q being processed stores the third sensor command, the fourth mechanism drive command, and the third mechanism drive command in this order. It is still further assumed that the transmission queue Q being processed stores the third sensor command, the fourth mechanism drive command, and the third mechanism drive command in this order, which is the order in accordance with which the commands are outputted to the additional cassette 21. In this case, the second main body communication controller 112 transmits the fourth mechanism drive command and the third mechanism drive command as commands having priority over the third sensor command to the additional cassette 21 in the order of the fourth mechanism drive command and the third mechanism drive command.

In the present embodiment, the acknowledgement unnecessary commands to be transmitted in the specified transmission order are the first mechanism drive command, the second mechanism drive command, the third mechanism drive command, and the fourth mechanism drive command. The reason for this is that the conveyance of a medium S contained in any of the additional cassettes 21 requires that each mechanical mechanism of the additional cassette 21 be controlled in an appropriate order.

Returning to the description of step SA8, when the result of the evaluation shows that no acknowledgement unnecessary command is contained (NO in step SA8), the second main body communication controller 112 carries out the process in step SA4.

The action of the image forming apparatus 1 taken when performing the image formation on the media S contained in the plurality of additional cassettes 21 will next be described.

Figure 5:
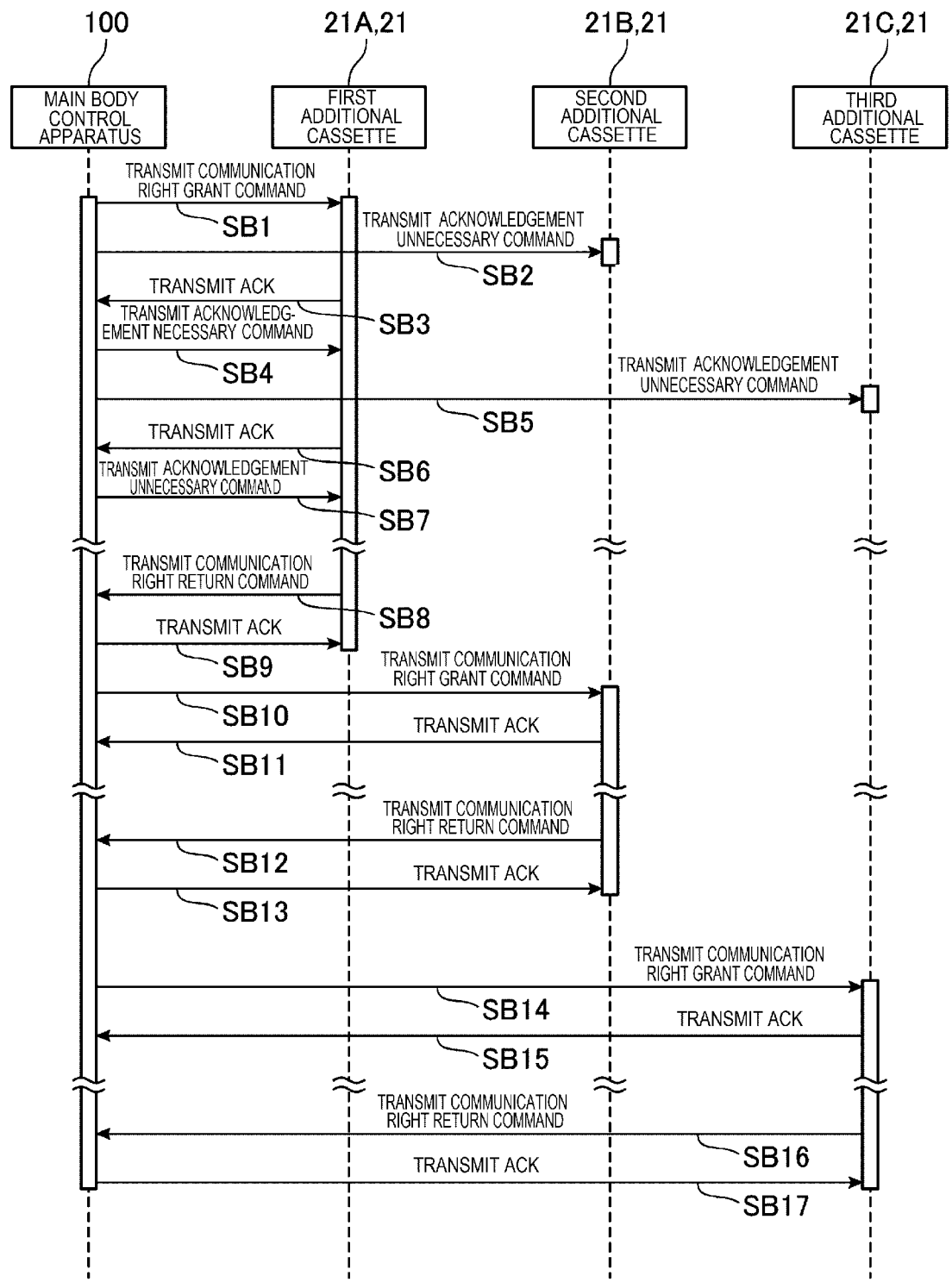
FIG. 5 is a sequence diagram showing an example of the action of the image forming apparatus.

FIG. 5 is a sequence diagram showing an example of the action of the image forming apparatus 1.

The action shown in the sequence diagram of FIG. 5 shows by way of example communication with each of the additional cassettes 21 in the following order: the first additional cassette 21A; the second additional cassette 21B; and the third additional cassette 21C. The action shown in the sequence diagram of FIG. 5 further shows by way of example that the main body control apparatus 100 transmits acknowledgement unnecessary commands to the second additional cassette 21B and the third additional cassette 21C during communication with the first additional cassette 21A.

The second main body communication controller 112 of the main body control apparatus 100 transmits the communication right grant command to the first additional cassette 21A (step SB1). The image forming apparatus 1 thus starts the exclusive control of the first additional cassette 21A.

The second main body communication controller 112 then transmits an acknowledgement unnecessary command to the second additional cassette 21B (step SB2).

The additional communication controller 211 of the first additional cassette 21A receives the communication right grant command and transmits an ACK to the main body control apparatus 100 in response to the communication right grant command (step SB3). Note that the main body control apparatus 100 transmits an acknowledgement unnecessary command to the second additional cassette 21B, and that the second additional cassette 21B transmits no ACK. The ACK transmitted in step SB6 therefore does not collide with other data on the communication line TL.

The second main body communication controller 112 of the main body control apparatus 100 transmits an acknowledgement necessary command to the first additional cassette 21A (step SB4).

The second main body communication controller 112 then transmits an acknowledgement unnecessary command to the third additional cassette 21C (step SB5).

The additional communication controller 211 of the first additional cassette 21A transmits an ACK to the main body control apparatus 100 in response to the acknowledgement necessary command transmitted in step SB4 (step SB6). Note that the main body control apparatus 100 transmits an acknowledgement unnecessary command to the third additional cassette 21C, and that the third additional cassette 21C transmitted no ACK. The ACK transmitted in step SB6 therefore does not collide with other data on the communication line TL.

The second main body communication controller 112 then transmits an acknowledgement unnecessary command to the first additional cassette 21A (step SB7).

In step SB7 and the following steps, the main body control apparatus 100 transmits an acknowledgement unnecessary command or an acknowledgement necessary command to the first additional cassette 21A in accordance with the command transmission shown in FIG. 4. Furthermore, in step SB7 and the following steps, the main body control apparatus 100 transmits acknowledgement unnecessary commands to the second additional cassette 21B and the third additional cassette 21C in accordance with the command transmission shown in FIG. 4.

The additional communication controller 211 of the first additional cassette 21A transmits the communication right return command to the main body control apparatus 100 (step SB8). The image forming apparatus 1 thus terminates the exclusive control of the first additional cassette 21A.

The second main body communication controller 112 of the main body control apparatus 100 transmits an ACK to the first additional cassette 21A in response to the communication right return command (step SB9).

The second main body communication controller 112 then transmits the communication right grant command to the second additional cassette 21B (step SB10). The image forming apparatus 1 thus starts the exclusive control of the second additional cassette 21B.

The additional communication controller 211 of the first additional cassette 21A receives the communication right grant command and transmits an ACK to the main body control apparatus 100 in response to the communication right grant command (step SB11).

When the exclusive control of the second additional cassette 21B starts after the exclusive control of the first additional cassette 21A, the command executer 212 of the second additional cassette 21B first executes the acknowledgement unnecessary command transmitted from the main body control apparatus 100 when the first additional cassette 21A is under the exclusive control.

In step SB11 and the following steps, the main body control apparatus 100 transmits an acknowledgement unnecessary command or an acknowledgement necessary command to the second additional cassette 21B in accordance with the command transmission shown in FIG. 4. The acknowledgement unnecessary command or the acknowledgement necessary command transmitted to the second additional cassette 21B in step SB11 or any of the following steps is a continuation of the command transmitted when the first additional cassette 21A and the main body control apparatus 100 communicate with each other.

The additional communication controller 211 of the second additional cassette 21B transmits the communication right return command to the main body control apparatus 100 (step SB12). The image forming apparatus 1 thus terminates the exclusive control of the second additional cassette 21B.

The second main body communication controller 112 of the main body control apparatus 100 transmits an ACK to the second additional cassette 21B in response to the communication right return command (step SB13).

The second main body communication controller 112 then transmits the communication right grant command to the third additional cassette 21C (step SB14). The image forming apparatus 1 thus starts the exclusive control of the third additional cassette 21C.

The additional communication controller 211 of the third additional cassette 21C receives the communication right grant command and transmits an ACK to the main body control apparatus 100 in response to the communication right grant command (step SB15).

When the exclusive control of the third additional cassette 21C starts after the exclusive control of the second additional cassette 21B, the command executer 212 of the third additional cassette 21C executes the acknowledgement unnecessary command transmitted from the main body control apparatus 100 when the first additional cassette 21A is under the exclusive control.

In step SB15 and the following steps, the main body control apparatus 100 transmits an acknowledgement unnecessary command or an acknowledgement necessary command to the third additional cassette 21C in accordance with the command transmission shown in FIG. 4. The acknowledgement unnecessary command or the acknowledgement necessary command transmitted to the second additional cassette 21B in step SB15 or any of the following steps is a continuation of the command transmitted when the first additional cassette 21A and the main body control apparatus 100 communicate with each other.

The additional communication controller 211 of the third additional cassette 21C transmits the communication right return command to the main body control apparatus 100 (step SB16). The image forming apparatus 1 thus terminates the exclusive control of the third additional cassette 21C.

The second main body communication controller 112 of the main body control apparatus 100 transmits an ACK to the third additional cassette 21C in response to the communication right return command (step SB17).

As described by using the case shown in FIG. 5, acknowledgement unnecessary commands are not followed by ACK transmission or reception. Therefore, when one additional cassette 21 is under the exclusive control in the image forming apparatus 1, acknowledgement unnecessary commands can be transmitted to the other additional cassettes 21. The main body control apparatus 100 thus allows the states of the other additional cassettes 21 that start undergoing the exclusive control to be the state in which the other additional cassettes 21 receive one or more commands. The image forming apparatus 1 can therefore speed up the image formation by the amount of transmission of the commands that the other additional cassettes 21 receive. As described with reference to the case shown in FIG. 5, the main body control apparatus 100 transmits an acknowledgement unnecessary command also to an additional cassette 21 under the exclusive control. The number of times of the ACK transmission and reception performed between an additional cassette 21 under the exclusive control and the main body control apparatus 100 can thus be reduced, whereby the image forming apparatus 1 can speed up the image formation.

Other embodiments of the present disclosure will be described.

Second Embodiment

The image forming apparatus 1 according to a second embodiment transmits an acknowledgement unnecessary command in accordance with whether or not the state of the image forming apparatus 1 relating to the additional cassettes 21 is the state in which the exclusive control is performed on any of the additional cassettes 21. The image formation controller 113 in the second embodiment evaluates whether or not the exclusive control is performed on any of the additional cassettes 21. The evaluation is performed based, for example, on whether or not the second main body communication controller 112 has transmitted the communication right grant command but has not received the communication right return command. When the image formation controller 113 determines that the exclusive control is not performed on any of the additional cassettes 21, the image formation controller 113 generates a command to be outputted to the additional cassette 21 that communicates with the image formation controller 113 as an acknowledgement necessary command. On the other hand, when the image formation controller 113 determines that the exclusive control is performed on any of the additional cassettes 21, the image formation controller 113 generates a command to be outputted to the additional cassette 21 that communicates with the image formation controller 113 as an acknowledgement unnecessary command. Note that the command generated as an acknowledgement unnecessary command is any of the first mechanism drive command, the second mechanism drive command, the third mechanism drive command, the fourth mechanism drive command, the first sensor command, and the second sensor command.

For example, when the image formation controller 113 generates a command to be transmitted to the first additional cassette 21A in the state in which the image formation controller 113 is not communicating with any of the additional cassettes 21, the image formation controller 113 generates each command as an acknowledgement necessary command.

For example, when the image formation controller 113 generates a command to be transmitted to the second additional cassette 21B when the image formation controller 113 is performing the exclusive control on the first additional cassette 21A, the first mechanism drive command, the second mechanism drive command, the third mechanism drive command, the fourth mechanism drive command, the first sensor command, and the second sensor command generated by the image formation controller 113 as the command to be transmitted to the second additional cassette 21B are acknowledgement unnecessary commands.

Third Embodiment

The image forming apparatus 1 according to a third embodiment transmits an acknowledgement unnecessary command in accordance with whether or not the state of the image forming apparatus 1 relating to the additional cassettes 21 is a state in which the total amount of data on the commands stored in the main body memory 120 is greater than or equal to a threshold. When the total amount of data on the commands stored in all the transmission queues Q is determined to be smaller than the threshold, the image formation controller 113 in the third embodiment generates each command to be outputted to the additional cassette 21 with which the image formation controller 113 communicates as an acknowledgement necessary command. On the other hand, when the total amount of data on the commands stored in all the transmission queues Q is determined to be greater than or equal to the threshold, the image formation controller 113 generates a command to be outputted to the additional cassette 21 with which the image formation controller 113 communicates as an acknowledgement unnecessary command. Note that the command generated as an acknowledgement unnecessary command is any of the first mechanism drive command, the second mechanism drive command, the third mechanism drive command, the fourth mechanism drive command, the first sensor command, and the second sensor command.

As described above, the image forming apparatus 1 includes the main body control apparatus 100, the main body cassette 17, and the additional cassettes 21, which differ from the main body cassette 17 and are coupled to the bus-shaped communication line TL, to which the main body control apparatus 100 is coupled. The main body control apparatus 100 transmits acknowledgement unnecessary commands, which each indicate that an ACK is unnecessary, to the additional cassettes 21 in accordance with the state of the image forming apparatus 1 relating to the additional cassettes 21.

Therefore, since acknowledgement unnecessary commands are transmitted to the additional cassettes 21 in accordance with the state of the image forming apparatus 1 relating to the additional cassettes 21, the main body control apparatus 100 can communicate with the additional cassettes 21 without transmitting or receiving ACKs. The image forming apparatus 1 can therefore reduce the period required to transmit and receive ACKs in the image formation. When a plurality of additional cassettes 21 are coupled to the main body control apparatus 100 via a bus, the image forming apparatus 1 can communicate with the plurality of additional cassettes 21 in parallel. The image forming apparatus 1 can thus speed up the image formation.

The main body control apparatus 100 does not transmit an acknowledgement unnecessary command to an additional cassette 21 when the number of additional cassettes 21 coupled to the bus-shaped communication line TL is smaller than one, that is, none of the additional cassettes 21 is coupled to the communication line TL. The main body control apparatus 100 transmits an acknowledgement unnecessary command to an additional cassette 21 when the number of additional cassettes 21 coupled to the bus-shaped communication line TL is greater than or equal to one.

Therefore, when one or more additional cassettes 21 are coupled to the main body control apparatus 100 via a bus, acknowledgement unnecessary commands are transmitted to the additional cassettes 21. Data collision can thus be avoided in the communication line TL, whereby the image forming apparatus 1 can speed up the image formation and perform the image formation appropriately.

The image forming apparatus 1 includes a plurality of additional cassettes 21. When the main body control apparatus 100 is not performing the exclusive control on any of the additional cassettes 21, the main body control apparatus 100 transmits acknowledgement necessary commands to the additional cassettes 21. When the main body control apparatus 100 is performing the exclusive control on any of the additional cassettes 21, the main body control apparatus 100 transmits acknowledgement unnecessary commands to the other additional cassettes 21.

Therefore, when the exclusive control is not performed on any of the additional cassettes 21, the reliability of the communication with the additional cassettes 21 can be ensured by ACKs, whereas when the exclusion control is performed on any of the additional cassettes 21, data collision can be avoided in the communication line TL. The image forming apparatus 1 can therefore speed up the image formation and, in accordance with the state of exclusive control of the additional cassettes 21, can appropriately ensure the reliability of the communication and avoid data collision.

The main body control apparatus 100 includes the main body memory 120, which stores commands to be transmitted to the additional cassettes 21. When the total amount of data on the commands stored in the main body memory 120 is smaller than the threshold, the main body control apparatus 100 transmits acknowledgement necessary commands to the second cassettes described above. When the total amount of data on the commands stored in the main body memory 120 is greater than or equal to the threshold, the main body control apparatus 100 transmits acknowledgement unnecessary commands to the additional cassettes 21.

The image forming apparatus 1 can thus switch the command to be transmitted to the additional cassettes 21 to acknowledgement unnecessary commands or acknowledgement necessary commands in accordance with the amount of data on the commands stored in the main body memory 120.

The main body control apparatus 100 includes the main body memory 120, which stores commands to be transmitted to the additional cassettes 21. When the main body memory 120 stores a plurality of commands, the main body control apparatus 100 transmits acknowledgement unnecessary commands to the additional cassettes 21 in such a way that the acknowledgement unnecessary command have priority over commands excluding acknowledgement unnecessary commands out of the commands stored in the main body memory 120.

A larger number of commands can thus be transmitted to the additional cassettes 21, whereby the image forming apparatus 1 can speed up the image formation.

When a plurality of acknowledgement unnecessary commands that are transmitted in a predetermined order are stored in the main body memory 120, the main body control apparatus 100 transmits the plurality of acknowledgement unnecessary commands to the additional cassettes 21 in accordance with the specified transmission order.

Transmitting the acknowledgement unnecessary commands to the additional cassettes 21 in the specified transmission order allows the additional cassettes 21 to process the acknowledgement unnecessary commands in an appropriate order. The image forming apparatus 1 can thus further speed up the image formation and perform the image formation appropriately.

The acknowledgement unnecessary commands include drive commands that instruct driving the mechanical mechanisms provided in the additional cassettes 21.

When any of the acknowledgement unnecessary commands received by the additional cassettes 21 is corrupted, the additional cassette 21 discards the corrupted acknowledgement unnecessary command. The configuration in which the drive commands that instruct driving the mechanical mechanism are acknowledgement unnecessary command therefore causes the image forming apparatus 1 not to operate as designed and stops operating when the acknowledgement unnecessary command received by any of the additional cassettes 21 is corrupted. The image forming apparatus 1, which does not carry out a dedicated process of dealing with corruption of an acknowledgement unnecessary command, can therefore stop operating to deal with the corruption.

In the method for controlling the image forming apparatus 1, the main body control apparatus 100 transmits acknowledgement unnecessary commands, which each indicate that an acknowledgement is unnecessary, to the additional cassettes 21 in accordance with the state of the image forming apparatus 1 relating to the additional cassettes 21.

The same effects as those provided by the image forming apparatus 1 described above can thus be provided.

The embodiments described above only show specific examples to which the present disclosure is applied. The present disclosure is not limited to the configurations in the embodiments described above, and can be implemented in a variety of aspects to the extent that they do not depart from the substance of the present disclosure.

The embodiments described above show the case where the image forming apparatus 1 includes three additional cassettes 21 by way of example. The image forming apparatus 1, however, only needs to include one or more additional cassettes 21, and the number of additional cassettes 21 provided in the image forming apparatus 1 is not limited to three.

In the embodiments described above, the "predetermined number" is set at one. The "predetermined number" is, however, not limited to one and may be one or more.

For example, the embodiments described above show the case where the image forming apparatus 1 is a multifunction machine. The image forming apparatus 1 is, however, not limited to a multifunctional machine, and may be any apparatus having at least an image forming function.

The embodiments described above show the case where the inkjet head 282 is a serial inkjet head, and the head that discharges inks onto a medium S may instead be a linear head or a lateral head. The image formation method used by the image forming apparatus 1 is not limited to the inkjet-type method. The inkjet head 282 is not limited to a head that discharges inks having the CMYK four colors, and may instead, for example, be a head that discharges inks having a larger number of colors, that is, the CMYK four colors to which special colors are added, or a head that can discharge a monochrome ink or inks having two colors.

The embodiments described above show the case where inks are supplied from the ink packs 20 to the inkjet head 282 by way of example, and the inkjet head 282 provided in the image forming apparatus 1 may instead have a configuration in which inks are supplied from ink cartridges, ink tanks, or the like.

The main body processor 110 and the additional processor 210 may each be formed of a single processor or a plurality of processors. The main body processor 110 and the additional processor 210 may each be hardware programmed so as to realize the corresponding functional sections. That is, the main body processor 110 and the additional processor 210 may each be formed, for example, of an ASIC (application specific integrated circuit) or an FPGA (field programmable gate array).

The portions of the image forming apparatus 1 shown in FIG. 3 are presented by way of example and are each not necessarily implemented in a specific form. That is, hardware corresponding to each of the portions is not necessarily implemented, and a single processor that executes a program can, of course, achieve the functions of the portions. Furthermore, part of the functions achieved by software in the embodiments described above may be achieved by hardware, or part of the functions achieved by hardware in the embodiments described above may be achieved by software. In addition, the specific detailed configuration of each of the other portions of the image forming apparatus 1 can be changed in any way.

For example, the step units of the action shown in FIGS. 4 and 5 are step units divided in accordance with the contents of primary processes for easy understanding of the actions of the portions of the image forming apparatus 1. How to produce the divided process units or the names of the process units do not limit the present disclosure. Any of the processes may be further divided into a larger number of step units in accordance with the content of the process. The step units may each be further divided into a large number of processes. The order of the steps may be interchanged as appropriate to the extent that the interchanged order does not interfere with the intent of the present disclosure.

What is claimed is:

1. An image forming apparatus comprising:
   a control apparatus;
   a first cassette; and
   a second cassette different from the first cassette and coupled to a bus-shaped communication line to which the control apparatus is coupled,
   wherein the control apparatus transmits to the second cassette an acknowledgement unnecessary command indicating that it is unnecessary for the second cassette to send an acknowledgment back to the control apparatus when a state of the image forming apparatus relating to the second cassette is a predetermined state, and does not transmit to the second cassette the acknowledgement unnecessary command when the state of the image forming apparatus relating to the second cassette is not the predetermined state.

2. The image forming apparatus according to claim 1,
   wherein the second cassette is formed of a plurality of second cassettes, and
   the control apparatus
   does not transmit the acknowledgement unnecessary command to the second cassette when the number of second cassettes coupled to the bus-shaped communication line is smaller than a predetermined number, but transmits the acknowledgement unnecessary command to the second cassettes when the number of second cassettes coupled to the bus-shaped communication line is greater than or equal to the predetermined number.

3. The image forming apparatus according to claim 2,
   wherein the control apparatus includes a storage that stores a command to be transmitted to the second cassettes, and
   when the storage stores a plurality of the commands, the control apparatus transmits the acknowledgement unnecessary command to the second cassettes out of the plurality of commands stored in the storage in such a way that the acknowledgement unnecessary command has priority over the commands excluding the acknowledgement unnecessary command.

4. The image forming apparatus according to claim 3,
   wherein when a plurality of the acknowledgement unnecessary commands that are transmitted in a predetermined order are stored in the storage, the control apparatus transmits the plurality of the acknowledgement unnecessary commands to the second cassettes in accordance with the specified transmission order.

5. The image forming apparatus according to claim 1,
   wherein the second cassette is formed of a plurality of second cassettes, and
   the control apparatus
   transmits, when exclusive control is not performed on any of the second cassettes, acknowledgement necessary commands each indicating that an acknowledgement is unnecessary to the second cassettes, and
   transmits, when the exclusive control is performed on any of the second cassettes, the acknowledgement unnecessary command to the other second cassettes.

6. The image forming apparatus according to claim 1,
   wherein the control apparatus includes a storage that stores a command to be transmitted to the second cassette, and
   when a total amount of data on the command stored in the storage is smaller than a threshold, the control apparatus transmits an acknowledgement necessary command indicating that an acknowledgement is necessary to the second cassette, whereas when the total amount of data on the command stored in the storage is greater than or equal to the threshold, the control apparatus transmits the acknowledgement unnecessary command to the second cassette.

7. The image forming apparatus according to claim 1,
   wherein the acknowledgement unnecessary command includes a drive command that instructs driving a mechanical mechanism provided in the second cassette.

8. A method for controlling an image forming apparatus including a control apparatus, a first cassette, and a second cassette different from the first cassette and coupled to bus-shaped communication line to which the control apparatus is coupled,
   wherein the control apparatus transmits to the second cassette an acknowledgement unnecessary command indicating that it is unnecessary for the second cassette to send an acknowledgment back to the control apparatus when a state of the image forming apparatus relating to the second cassette is a predetermined state, and does not transmit to the second cassette the acknowledgement unnecessary command when the state of the image forming apparatus relating to the second cassette is not the predetermined state.

* * * * *